Feb. 21, 1933.　　　　　F. A. GRAY　　　　　1,898,952
VALVE
Filed March 10, 1930
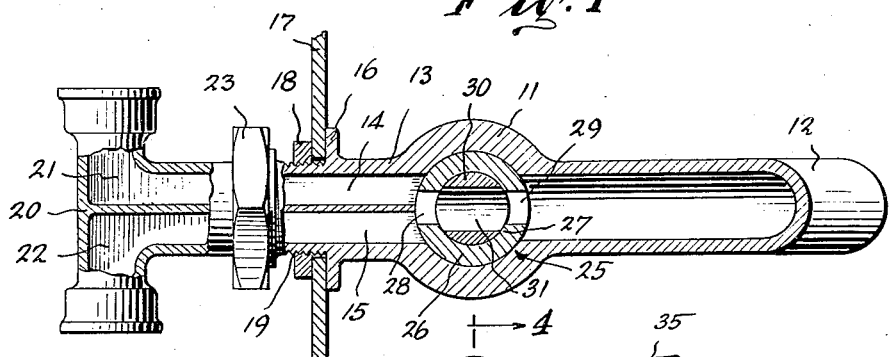
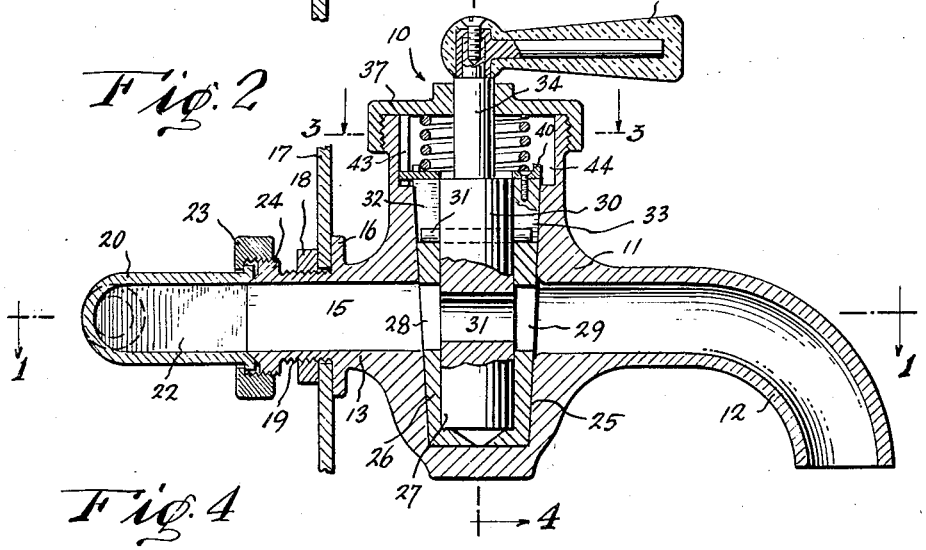
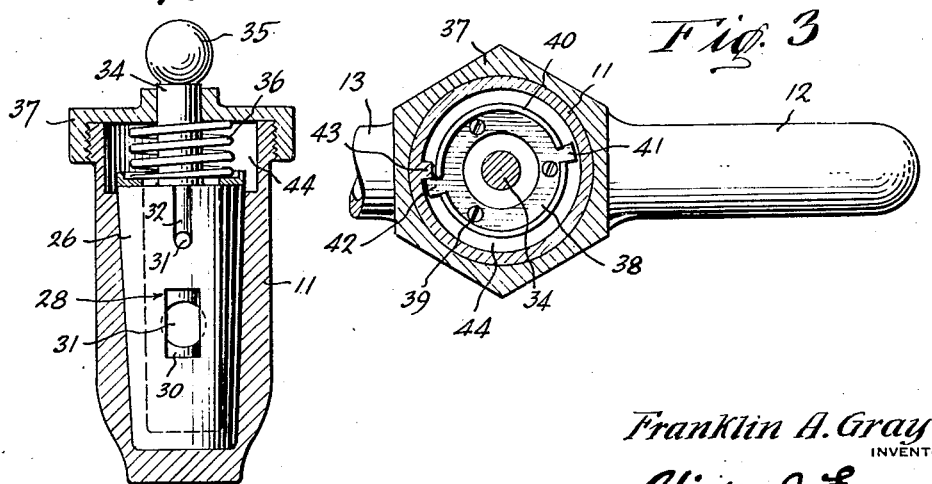
Franklin A. Gray
INVENTOR
BY Victor J. Evans
ATTORNEY Patented Feb. 21, 1933

1,898,952

UNITED STATES PATENT OFFICE

FRANKLIN A. GRAY, OF WEST NEW BRIGHTON, NEW YORK

VALVE

Application filed March 10, 1930. Serial No. 434,643.

This invention relates to valves, and more particularly to valves of the multi-way inlet, mixing type, having a common outlet.

The primary object of the invention is to enable the valve to efficiently control the flow of a plurality of mediums, whether liquid, gaseous or solid, such as powdered or granular material, the mediums being deliverable individually to and through the valve, or a plurality of mediums being combinable in the valve for delivery through a common outlet, the flow in each instance being controllable within desired maximum and minimum limits for each medium.

Another object of the invention is to provide a mixing valve in which a rotatable plug is adapted to control the flow from a plurality of inlets to a common outlet to obtain any desired mixture of the mediums, the rotatable plug being also adapted to regulate the velocity or volume of flow of combined mediums.

Still another object is to enable a valve of this type to be operated by a single manually actuated handle or the like to simultaneously control both the relative mixture of a plurality of mediums and the velocity or volume of flow of the combined mediums.

A further object is to provide a mixing valve of the general type stated in which the flow through the valve, controlled by the rotatable plug as to selection or combination of the mediums, is also controllable as to velocity or volume by a reciprocable stem operable in conjunction with the rotatable plug, whereby a very fine regulation of the selection or combination of the mediums, as well as a very fine regulation of the speed or volume of flow through the valve are obtainable by a single facile operating movement on the part of the user.

A still further object is to provide a mixing valve of this character which embodies numerous advantages whereby the same may be readily applicable to use for many purposes, such as controlling the flow of hot and cold water for many and varied purposes; or a plurality of gaseous mediums, for lighting, heating and otherwise; or for charging a liquid with a gas; or for mixing a solid medium, such as cement for instance, with a liquid such as water; and, in fact for use with any plurality of mediums wherever regulation of the supply of each medium or a plurality of mediums may be desirable to meet varying requirements.

Yet another object is to simplify and improve the construction and operation of mixing valves and to reduce the cost of manufacture thereof, whereby the same may be readily availed of to the advantage of the public generally.

Other objects and advantages of the invention will be hereinafter specifically pointed out, or will become apparent, as the specification proceeds.

With the above indicated objects in view, the invention resides in certain novel constructions and combinations and arrangements of parts, clearly described in the following specification and fully illustrated in the accompanying drawing, which latter shows embodiments of the invention as at present preferred.

In said drawing:

Fig. 1 is a transverse sectional view through a faucet embodying my present valve, taken substantially on the line 1—1 of Fig. 2; looking in the direction of the arrows;

Fig. 2 is a vertical sectional view through the faucet, taken at a right angle to the view shown in Fig. 1;

Fig. 3 is a transverse sectional view through the body of the faucet, taken substantially on the line 3—3 of Fig. 2, looking in the direction of the arrows; and Fig. 4 is a vertical sectional view taken substantially on the line 4—4 of Fig. 2.

By way of preference, for the purpose of clearly illustrating this invention, the valve is here shown as applied to a faucet for use in controlling the flow of hot and cold water, but it is to be understood that I do not wish to confine myself to this specific use, since the present valve construction can be embodied in practically any construction where it may be desirable to control the flow from a plurality of inlets.

The faucet 10 in this instance includes a body 11, an outlet or spout 12, and an inlet portion 13, this inlet portion 13 having two inlet passages 14 and 15. The inlet portion 13 is here shown provided with a flange 16 adapted to abut against a wall or the like 17, the faucet being secured in place by a suitable nut 18 screw-threaded to the end of the inlet portion 13, as indicated at 19.

A duplex inlet fitting 20, having passages 21 and 22, is in this instance connected to the inlet portion 13, as by means of a coupling member 23 adapted to screw on to the threaded flange 24 provided at the extreme outer end of the inlet portion 13, the connection being such that the passages 21 and 22 communicate with the inlet passage 14 and 15, respectively.

The construction just described is adapted to supply hot and cold water, for instance, to the faucet 10; and the present valve construction is adapted to regulate the flow from the inlets 14 and 15 to the single outlet, here shown as the spout 12, either selectively, so that hot or cold water may be conducted to the spout individually; or in combined relation so that the hot and cold water may be mixed, either in substantially equal proportions or in different proportions of each.

For the purposes just stated, the body 11 preferably has a substantially frusto-conical bore 25, this bore 25 having communication with the inlet passages 14 and 15 and with the outlet passage of the spout 12; and the present valve construction is fitted within the bore 25 to control and regulate the flow of the respective liquids through the faucet.

This valve construction in the present instance includes a rotatable plug 26 having a central chamber 27, an inlet port 28 and an outlet port 29, the inlet port 28 being adapted to communicate with one or both of the inlet passages 14 and 15, and the outlet port 29 being adapted to communicate with the spout 12 in any operative position of the plug 26 when the valve is open to any degree. A vertically reciprocable stem 30 is fitted in the central chamber 27 of the plug 26, this stem having a transverse passage 31 adapted to afford communication between the plug ports 28 and 29.

To rotate the plug 26 from its "off" position to any desired "on" position, such for instance as illustrated in Figs. 1 and 2, means cooperative between the reciprocable stem 30 and the plug 26 are provided, whereby rotation of the stem 30 will effect rotation of the plug 26. To this end the stem 30 is provided with a transverse pin 31 the ends of which are adapted to traverse diametrically opposite slots 32 and 33 provided at the upper part of the plug 26; and the stem 30 is provided with an axial extension or rod 34 to the upper end of which rod 34 a manipulating handle 35 is secured.

Means are provided to hold the plug 26 firmly to its seat in the bore 25, and in this instance said means consist of a coiled spring 36 which acts between the top of the plug 26 and the under side of a suitable screw cap 37. This spring 36 seats in a cup member 38 secured to the top of the plug 26, as by suitable screws 39.

The cup member 38 in this instance is adapted to perform an additional function of limiting the "on" and "off" movements of the plug 26, the cup being conveniently employed for this purpose since it forms part of and moves with the plug. To this end the rim 40 has portions bent or extended outwardly at diametrically opposite points to produce stops 41 and 42; these stops being adapted to alternately abut against a lug 43 formed in the side wall of the chamber 44 formed above the bore 25.

Thus it will be seen that manipulation of the handle 35 will effect rotation of the plug 26 from its "off" position to any desired "on" position, so that, say, in one position passage 14, port 28, passage 31, port 29 and spout 12 will be in communication to conduct a medium, such as hot water, from the inlet passage 14 only, to the spout 12. In another position another medium, such as cold water, only, can be conducted from the inlet passage 15 to the spout 12, communication in this instance being through the passage 15, and to the port 28. In other operative positions of the plug 26, both passages 14 and 15 can be placed in communication with the port 28, it being understood that the plug can be turned so that more or less of one medium than another will be admitted to the port 28, as the user may desire, the two mediums thus being combined or mixed during passage through the valve.

When one medium only is desired to be conducted through the valve and it is desired to regulate the velocity or volume of the flow, this may be accomplished by rotating the plug 26 so that the port 28 will only be in partial registration with one or the other of the passages 14 or 15. However, it is an important feature of the invention to enable the user to also regulate the velocity or volume of the flow of a combined or mixed medium; and, as well, to quickly and easily alter the velocity or volume of one medium only when the valve is in position to conduct one medium only to the spout. To this end means are provided to effect alteration in the velocity or volume of the flow through the valve in any of its operative positions, by restricting the flow between the ports 28 and 29. Such restriction is accomplished by an upward movement of the stem 30, by means of the handle 35, whereby the passage 31 of the stem may be partly, or entirely withdrawn from registration with the ports 28 or 29. Thus, any desired adjustment of the valve may be accomplished by a simple combined rotative and vertical movement of the handle 35, imparted by the hand of the user; and the stem 30 may be set and allowed to remain in any desired position during continued flow of the medium or combined mediums through the valve. It will be seen that during the upward and downward movements of the stem 30 the ends of the pin 31 will traverse the slots 32 and 33, and the upper part of the stem will pass through the central opening of the cup member; and the portions of the cup member above the slots 32 and 33 will act as stops to limit the upward movement of the stem 30.

The hereinabove described construction admits of considerable modification without departing from the invention; therefore, I do not wish to be limited to the precise arrangements shown and described, which are as aforesaid, by way of illustration merely. In other words, the scope of protection contemplated is to be taken solely from the appended claims, interpreted as broadly as is consistent with the prior art.

What is claimed is:

1. In a valve of the character described, a body having a bore, with a plurality of inlet passages and an outlet passage in communication with said bore, a rotatable plug in said bore, said plug having a central chamber and an inlet and an outlet port adapted to communicate with said central chamber, said inlet port adapted to communicate with one of said inlet passages in one position of said rotatable plug and with said plurality of inlet passages during another position of said plug, a stem in said central chamber, said stem having a transverse passage adapted to afford communication between said ports, said stem and said plug having cooperative means to prevent relative rotation thereof, a manipulating handle secured to said stem, a cap for the upper part of said valve body, a coiled spring acting between said cap and the upper part of said plug to hold the latter to its seat in said bore, said plug and said valve body including cooperative devices to limit the rotative movement of said plug to define fully "on" and "off" positions of the valve, said stem adapted to transmit rotative movement from said handle to said plug to move said plug to operative position whereby in one position of said plug one of said inlets communicates with said outlet and in another position a plurality of inlets communicate with said outlet, and said stem being vertically movable relative to said plug to restrict the passage through said plug and transverse stem-passage, whereby to alter the velocity or volume of flow through the valve.

2. In a valve of the character described, a body having a bore, with a plurality of inlet passages and an outlet passage in communication with said bore, a rotatable plug in said bore, said plug having a central chamber and an inlet and an outlet port adapted to communicate with said central chamber, said inlet port adapted to communicate with one of said inlet passages in one position of said rotatable plug and with said plurality of inlet passages during another position of said plug, a vertically movable stem in said central chamber, said stem having a transverse passage adapted to afford communication between said ports, said stem and said plug including cooperative pin and slot means to prevent relative rotation while affording vertical movement of said stem within said plug, said stem having an operating rod, a manipulating handle secured to said rod, a cap for the upper part of said body, a coiled spring acting between said cap and the upper part of said plug to hold the latter to its seat in said bore, said plug including a cup portion to receive the inner end of said spring, said cup member having opposite outwardly extending portions and said body having a lug above said bore adapted to be engaged by said outwardly extending cup portions in "on" and "off" positions of the valve, said stem and pin and slot means being adapted to transmit rotative movement from said handle to said plug to move said plug to operative position whereby in one position of said plug one of said inlets communicates with said outlet and in another position a plurality of inlets communicate with said outlet, said stem being vertically movable to withdraw said stem passage from complete registration with said plug inlet and outlet ports, whereby to restrict the effective area of said stem passage and hence retard the flow through said valve.

3. In a valve of the character described, a body having a bore, with a plurality of inlet passages and an outlet passage in communication with said bore, a rotatable plug in said bore, said plug having a central chamber and an inlet and an outlet port adapted to communicate with said central chamber, said inlet port adapted to communicate with one of said inlet passages in one position of said rotatable plug and with said plurality of inlet passages during another position of said plug, a vertically movable stem in said central chamber, said stem having a transverse passage adapted to afford communication between said ports, said stem having a transverse pin and the upper part of said plug having diametrically opposite slots to receive the ends of said pin, said stem having an operating rod, a manipulating handle secured to said rod, a cap for the upper part of said body, a coiled spring acting between said cap and the upper part of said plug to hold the latter to its seat in said bore, said plug having a cup member to receive the inner end of said spring, said cup member having opposite outwardly extending portions and said body having a lug above said bore adapted to be engaged by said outwardly extending cup portions in "on" and "off" positions of the valve, said pin adapted to transmit rotative movement from said handle to said plug for moving said plug to operative position whereby in one position of said plug one of said inlets communicates with said outlet and in another position a plurality of inlets communicate with said outlet, said slots being adapted to afford vertical movement of said stem relative to said plug whereby to alter the effective area of said stem passage exposed to said inlet and outlet ports to control the flow through said transverse stem-passage.

In testimony whereof I hereby affix my signature.

FRANKLIN A. GRAY.